(12) United States Patent
Fujita

(10) Patent No.: US 8,590,587 B2
(45) Date of Patent: Nov. 26, 2013

(54) PNEUMATIC TIRE

(75) Inventor: Hiroshi Fujita, Kobe (JP)

(73) Assignee: Sumitomo Rubber Industries, Ltd., Kobe (JP)

(\*) Notice: Subject to any disclaimer, the term of this patent is extended or adjusted under 35 U.S.C. 154(b) by 396 days.

(21) Appl. No.: 12/852,985

(22) Filed: Aug. 9, 2010

(65) Prior Publication Data

US 2011/0083782 A1   Apr. 14, 2011

(30) Foreign Application Priority Data

Oct. 8, 2009   (JP) ................. 2009-234463

(51) Int. Cl.
  *B60C 9/02*   (2006.01)
  *B60C 9/04*   (2006.01)
  *B60C 9/08*   (2006.01)
(52) U.S. Cl.
  USPC ........... 152/548; 152/540; 152/550; 152/552; 152/558; 152/560; 156/117; 156/133
(58) Field of Classification Search
  USPC .................. 152/548–564; 156/117
  See application file for complete search history.

(56) References Cited

U.S. PATENT DOCUMENTS

| | | | | |
|---|---|---|---|---|
| 1,270,053 A | * | 6/1918 | Ream | 245/1.5 |
| 1,386,072 A | * | 8/1921 | Pratt | 245/1.5 |
| 3,052,275 A | * | 9/1962 | Hylbert, Jr. | 152/541 |
| 3,406,733 A | * | 10/1968 | Boileau | 152/542 |
| 4,726,408 A | * | 2/1988 | Alie et al. | 152/541 |
| 4,872,497 A | * | 10/1989 | Hanada et al. | 152/541 |
| 5,010,938 A | * | 4/1991 | Assaad et al. | 152/539 |
| 6,073,669 A | * | 6/2000 | Takada et al. | 152/510 |

FOREIGN PATENT DOCUMENTS

JP   04257703 A   *  9/1992   ............... B60C 9/02

OTHER PUBLICATIONS

English Summary of JP04257703A; Sakamoto, Masayauki; Pneumatic Tire; No date.*

\* cited by examiner

*Primary Examiner* — Justin Fischer
*Assistant Examiner* — Kendra Shin
(74) *Attorney, Agent, or Firm* — Birch, Stewart, Kolasch & Birch, LLP

(57) ABSTRACT

A pneumatic tire comprises a tread portion, a pair of sidewall portions, a pair of bead portions, a pair of bead cores disposed one in each of the bead portions, and a carcass ply extending between the bead portions through the tread portion and sidewall portions, wherein the carcass ply is composed of windings of at least one carcass cord looped around the two bead cores in a helical manner and/or figure-of-eight manner.

4 Claims, 10 Drawing Sheets helical and/or figure-of-eight

PNEUMATIC TIRE

TECHNICAL FIELD

The present invention relates to a pneumatic tire, more particularly to a carcass ply reinforced by windings of a continuous cord looped around a pair of bead cores.

BACKGROUND ART

In general, a pneumatic tire comprises a carcass ply reinforced by a number of carcass cords extending between bead portions and turned up around bead cores from the inside to the outside of the tire so that the carcass ply is secured to the bead cores.

In recent years, on the other hand, in view of environment improvements, tire manufactures make great efforts to reduce the weight of passenger car tires as well as heavy duty pneumatic tires.

By decreasing the size of the carcass ply turnup portions, the tire weight can be reduced.

However, in the case of the passenger car tires, there is a trend toward very low tire aspect ratios. In other words, the radial dimension of the tire sidewall portions becomes very small. Therefore, it is difficult to reduce the size of the carcass ply turnup portions any more.

In the case of the heavy duty pneumatic tires, the tires have a high probability of being used under extremely severe service conditions with heavy loads and very high tire inflation pressure, therefore, if the size of the carcass ply turnup portions is decreased, there is a possibility that the carcass ply turnup portion is slipped out of the bead core.

Further, as a result of tire weight saving, the bead portions and sidewall portions of such a tire are more deflected or bent during running, therefore, the carcass ply turnup ends are more likely to undergo larger bending/compressive stress, and separation failures from the surrounding rubber tends to occur starting from the turnup ends.

SUMMARY OF INVENTION

It is therefore, an object of the present invention to provide a pneumatic tire in which, in order to achieve a tire weight reduction, the carcass ply turnup portions are eliminated, while assuring the securing of the carcass ply to the bead cores, and thereby the separation failure starting from the carcass ply turnup ends is resolved, and the bead durability can be improved.

According to the present invention, a pneumatic tire comprises: a pair of bead cores one disposed in each bead portion, and a carcass ply extending between the bead portions through a tread portion and sidewall portions, wherein the carcass ply is composed of windings of a carcass cord looped around the bead cores.

Therefore, both ends of the carcass ply are secured to the bead cores, without forming the conventional turnup portions. Accordingly, the carcass ply is completely prevented from being slipped out of the bead core. The separation failures starting from the turnup ends are completely prevented. Thus, the bead durability can be greatly improved, while achieving a tire weight reduction.

DESCRIPTION OF EMBODIMENTS

Taking a passenger car radial tire as an example, embodiments of the present invention will now be described in detail in conjunction with accompanying drawings.

Figure 1:
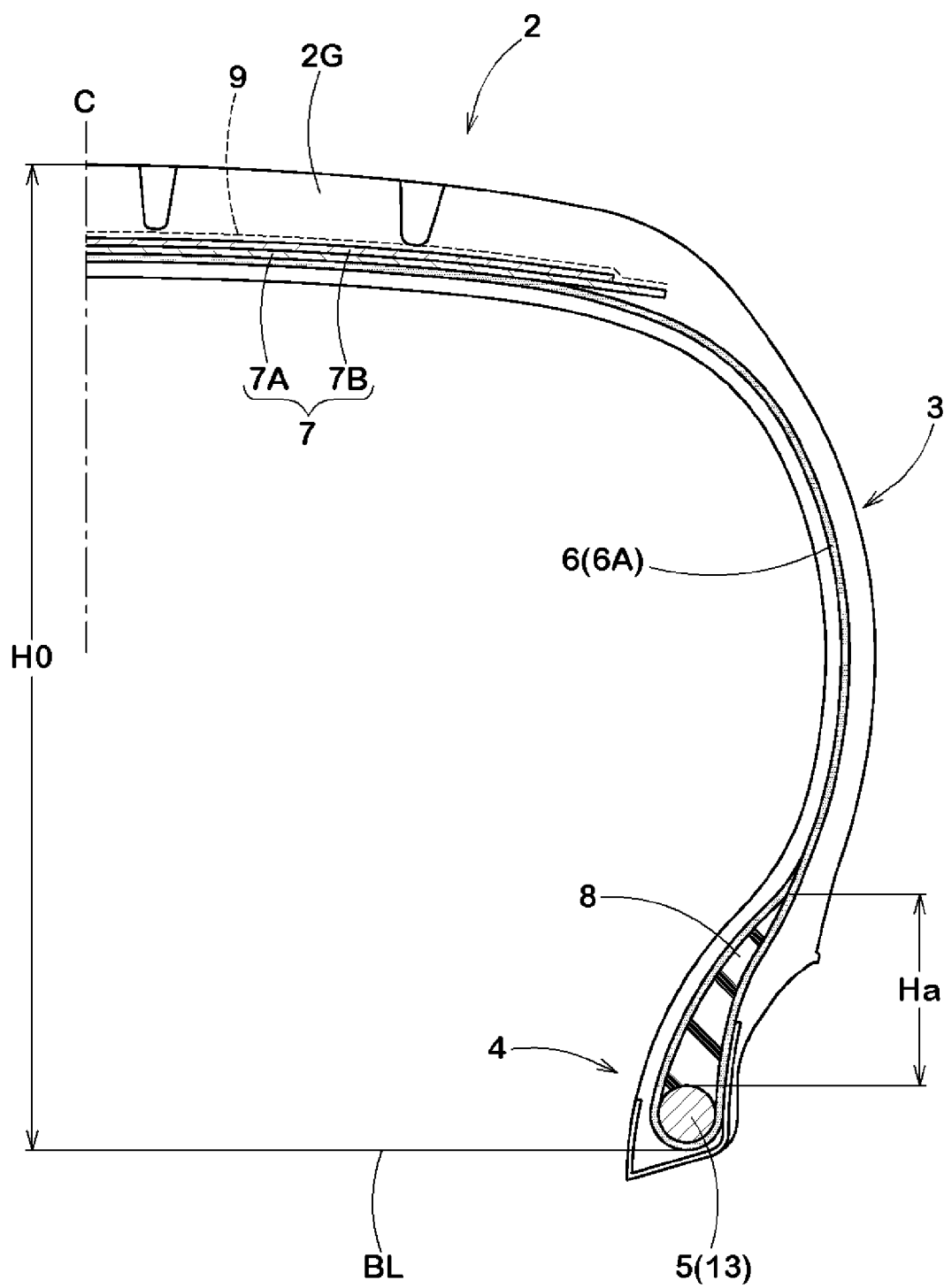
FIG. 1 is a cross sectional view of a pneumatic tire according to the present invention.

According to the present invention, as shown in FIG. 1, a pneumatic tire 1 comprises: a tread portion 2, a pair of sidewall portions 3, a pair of axially spaced bead portions 4 each with a bead core 5A,5B therein, a toroidal carcass 6 extending between the bead portions 4 through the tread portion 2 and sidewall portions 3, and a tread reinforcing belt 7, 9 disposed radially outside the carcass 6 in the tread portion 2.

The tread reinforcing belt comprises a breaker 7 and optionally a band 9.

The breaker 7 comprises: at least two cross plies 7A and 7B of high modulus cords laid at an angle of from 10 to 35 degrees with respect to the tire equator C. In this example, steel cords are used as the breaker cords, and the breaker consists of the two cross breaker plies 7A and 7B.

The band 9 is composed of a cord or cords wound helically on the radially outside of the breaker 7 at a small angle of at most about 5 degrees for example almost zero degree with respect to the tire equator C. As the band cords, for example, organic fiber cords such as nylon are used.

In this example, the band 9 is a single full-width band covering the overall width of the breaker 7. However, a pair of edge bands each covering an edge portion of the breaker only can be used alone or in combination with the full-width band.

The carcass 6 comprises a carcass ply 6A made of windings 11 of at least one (in this embodiment, only one) continuous cord 10 looped around the paired bead cores 5A and 5B. The angles of the windings 11 are not less than 80 degrees with respect to the tire equator C.

For the carcass cord 10, organic fiber cords, for example, nylon, polyester, rayon, aromatic polyamide and the like can be suitably used.

Figure 2:
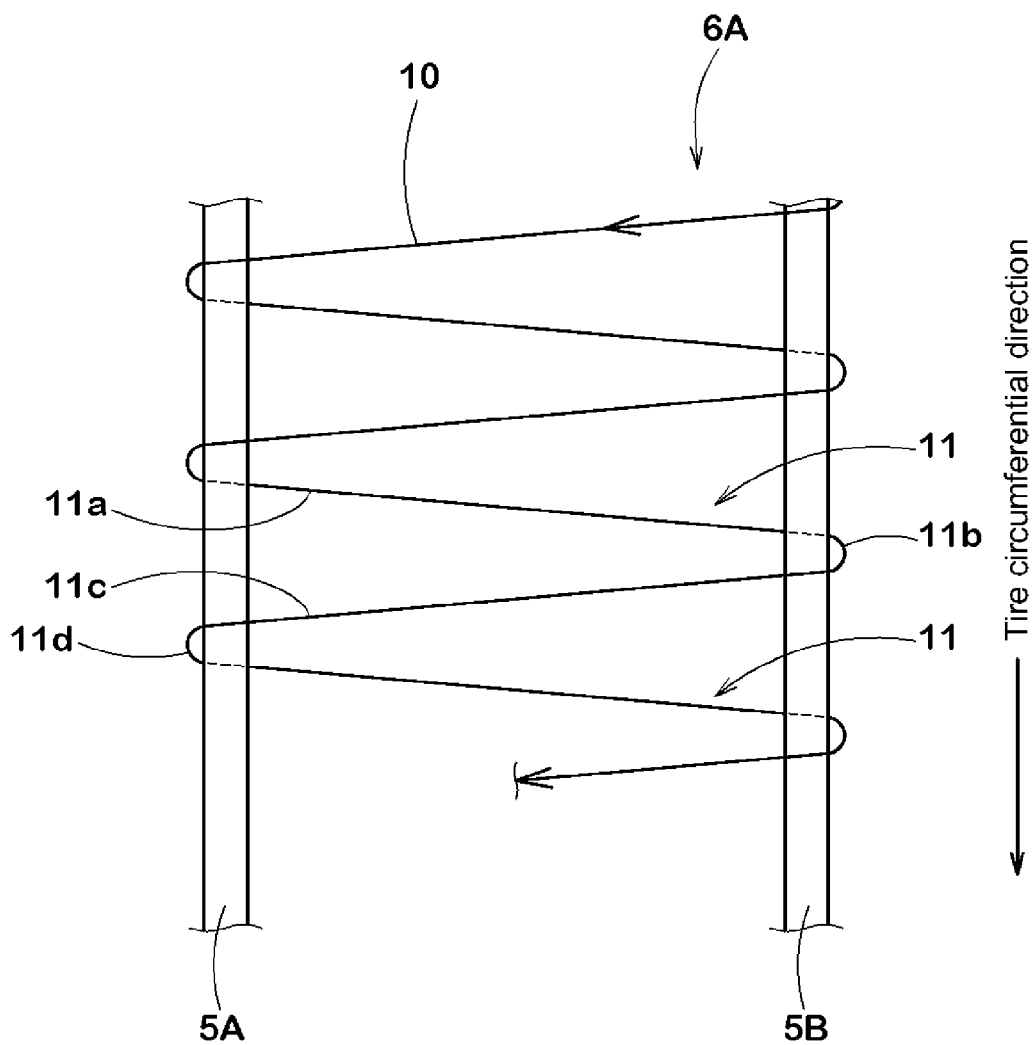
FIG. 2 shows the carcass cord looped around a pair of bead cores in a helical manner.
Figure 2:
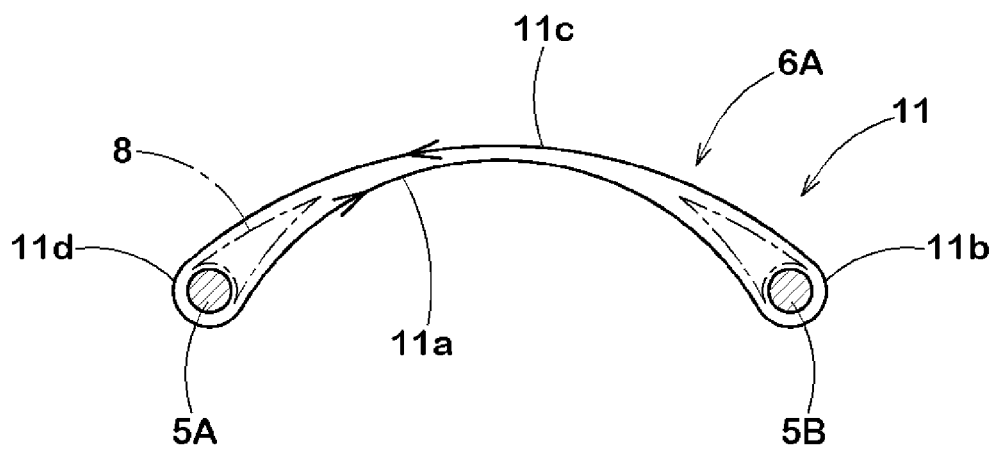
Figure 3:
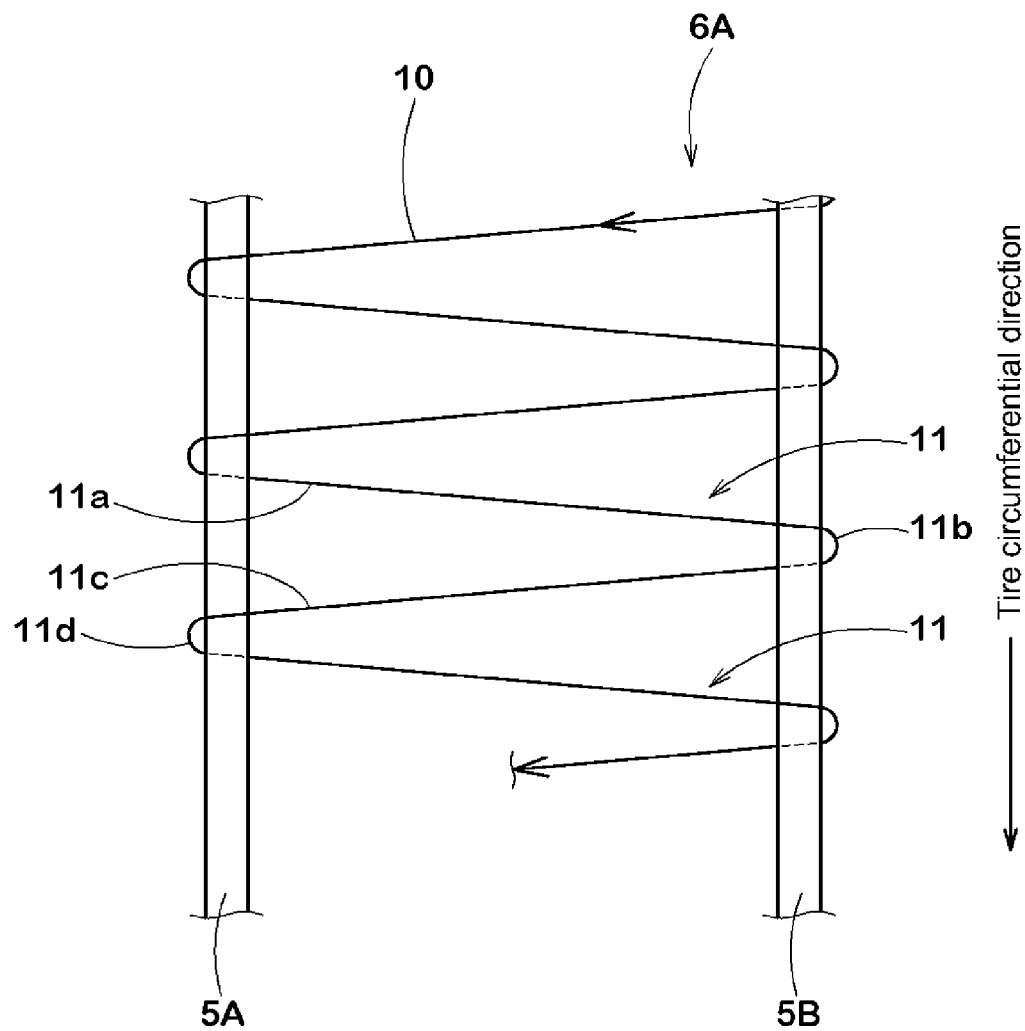
FIG. 3 shows the carcass cord looped around a pair of bead cores in a figure-of-eight manner.
Figure 3:
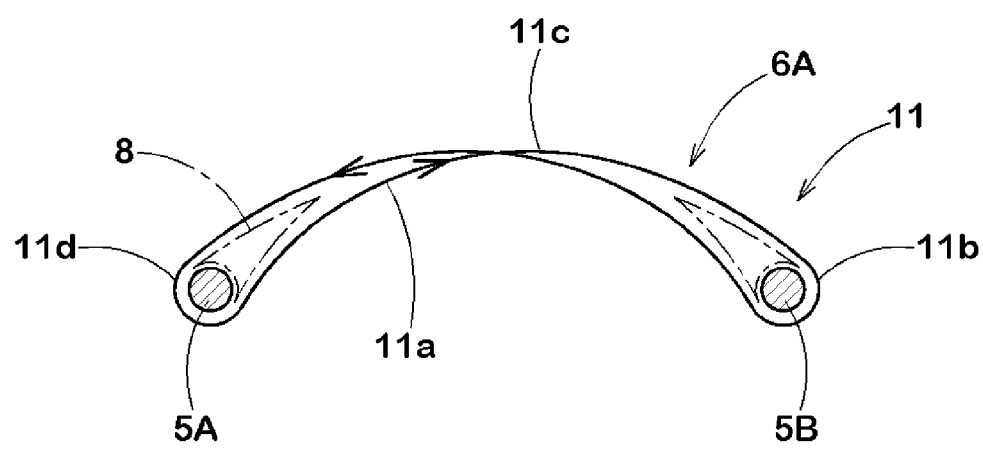

As shown in FIG. 2 and FIG. 3, the carcass cord 10 is looped around the bead core 5A, and extended to the bead core 5B, then again looped around the bead core 5B, and extended to the bead core 5A. This sequence is repeated along the entire circumference. Thus, each of the windings 11 is composed of a first looped part 11b looped around the bead core 5B, a second looped part 11d looped around the bead core 5A, and first and second lengthy parts 11a and 11c extending between the first looped part 11b and second looped part 11d.

In the example shown in FIG. 2, the carcass cord 10 is looped around the bead cores 5A and 5B in a helical manner.

In other words, in the process of forming the carcass ply, when the carcass cord 10 is wound around the bead core 5A in the counterclockwise direction (or clockwise direction), then the carcass cord 10 is wound around the other bead core 5B in the same counterclockwise direction (or clockwise direction).

In this example, accordingly, in each of the bead portions, the first lengthy parts 11a are located axially inside the bead cores, and the second lengthy part 11c are located axially outside the bead cores.

In the example shown in FIG. 3, the carcass cord 10 is looped around the bead cores 5A and 5B in a figure-of-eight manner. In other words, in the process of forming the carcass ply, when the carcass cord 10 is wound around the bead core 5A in the counterclockwise direction (or clockwise direction), then the carcass cord 10 is wound around the other bead core 5B in the opposite clockwise direction (or counterclockwise direction). In this case, the first lengthy parts 11a cross the second lengthy part 11c. Therefore, disarrangement of the windings can be prevented.

In this example, accordingly, the first lengthy parts 11a are located axially inside the bead core 5A in one of the bead portions, and axially outside the bead core 5B in the other bead portion. The second lengthy part 11c are located axially outside the bead core 5A in one of the bead portions, and axially inside the bead core 5B in the other bead portion.

Further, it is possible to form the carcass ply which comprises circumferential parts in which the carcass cord 10 is looped around the bead cores 5A and 5B in the helical manner, and circumferential parts in which the carcass cord 10 is looped around the bead cores 5A and 5B in the figure-of-eight manner.

Figure 4:
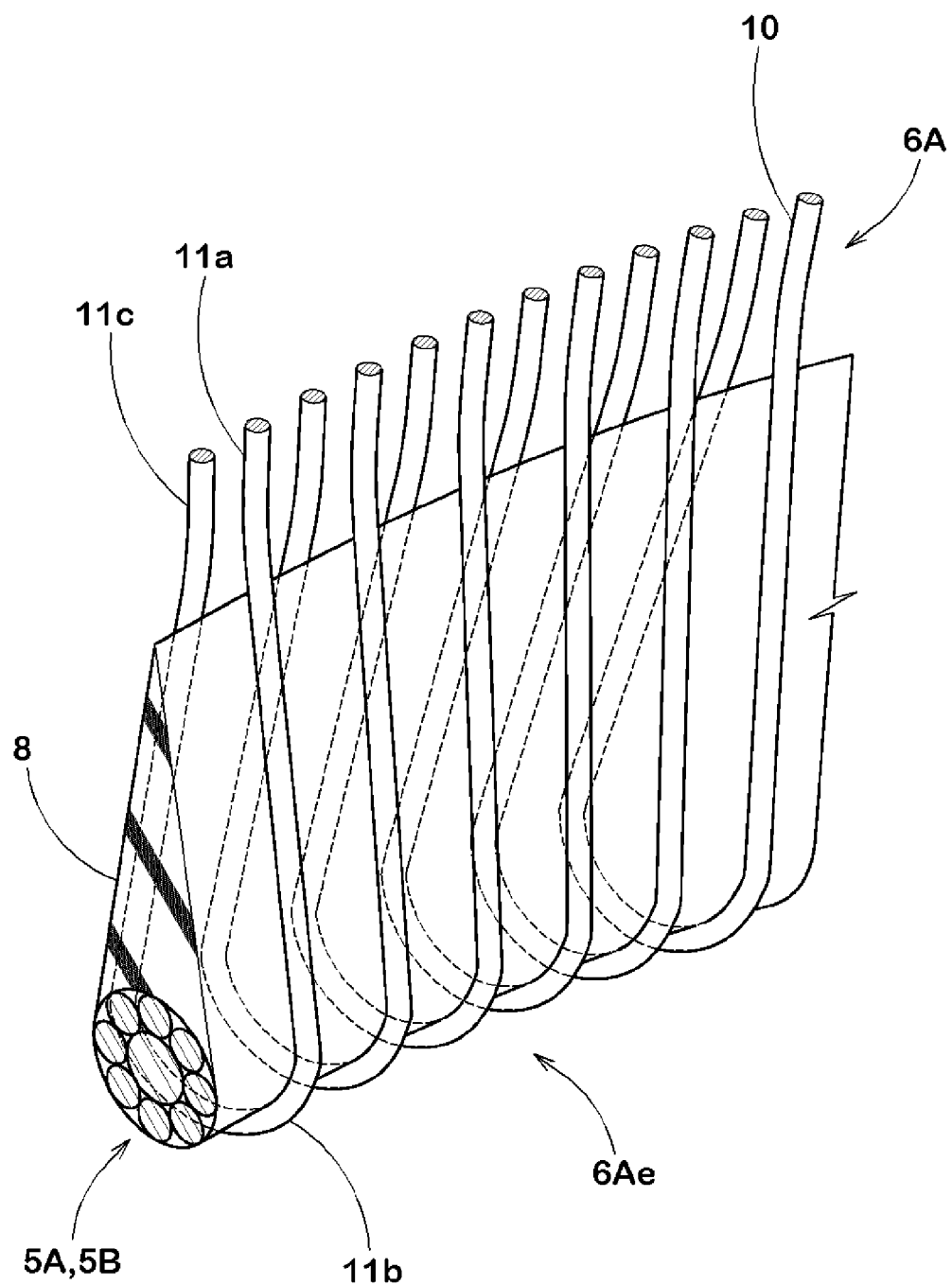
FIG. 4 is a perspective view showing a bead core and a bead apex disposed in the windings of the carcass cord.

Therefore, both ends 6Ae of the carcass ply 6A are perfectly secured to the bead cores 5A and 5B as shown in FIG. 4. Further, the carcass ply 6A does not have conventional turned up portions, therefore, the tire weight can be reduced accordingly. The carcass ply 6A does not have cut edges on which bending/compressive stress tends to concentrate, therefore, the separation failures due to cut edges are resolved, and the bead durability can be improved.

The cord count (ends/5 cm width) of the carcass ply 6A can be determined freely in the same way as in the conventional carcass ply having turnup portions.

In this embodiment, as shown in FIG. 1, the bead portions 4 are each provided with a bead apex 8 made of a hard rubber having a rubber hardness of from 50 to 98 degrees in order to reinforce the bead portions 4 and increase the bead rigidity, and thereby to improve the bead durability and steering stability.

The bead apex 8 extends radially outwardly from the bead core 5 in a tapered manner. The radial height Ha of the bead apex 8 from the bead core 5 is preferably set in a range of from to 70% of the tire section height H0 from the bead base line BL in view of the steering stability and ride comfort.

As shown in FIG. 4, the bead apex 8 is disposed within the windings, more specifically, between the first lengthy parts 11a and second lengthy parts 11c.

Therefore, on the radially inside of the radially outer end of the bead apexes, the carcass ply 6A is double-layered.

But, on the radially outside of the radially outer end of the bead apexes, in other words, in the tread portion 2 and sidewall portions 3, the carcass ply 6A is single-layered.

In the case of the above-mentioned helical manner, in each of the bead portions, the first lengthy parts 11a are located axially inside the bead apexes 8, and the second lengthy part 11c are located axially outside the bead apexes 8.

In the case of the figure-of-eight manner, the first lengthy parts 11a are located axially inside the bead apex 8 in one of the bead portions, but axially outside the bead apex 8 in the other bead portion. Accordingly, the second lengthy part 11c are located reversely thereto.

Figure 5A:
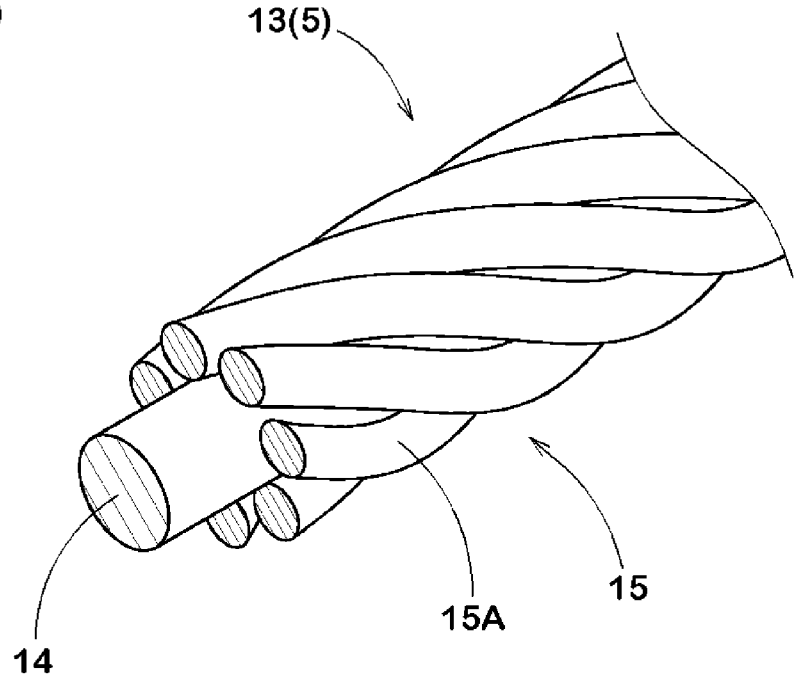
FIG. 5(A) is a perspective view of a cable bead core.

In the case that the bead apex 8 is disposed in each of the bead portions, a cable bead core 13 as shown in FIG. 5(A) is preferably used as the bead core 5.

The cable bead core 13 has a round cross sectional shape, and has such a structure that an annular core wire 14 is disposed in its center in the cross section, and at least one sheath layer 15 made of one or more sheath wires 15A helically wound around the core wire 14 is provided. Therefore, the sheath layer 15 is somewhat rotatable around the core wire 14.

Figure 5B:
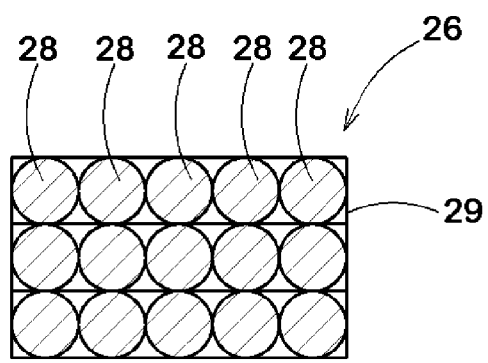
FIG. 5(B) is a cross sectional view of a tape bead core.

By the way, FIG. 5(B) shows so called tape bead core 26 formed by winding a rubber tape 29 in which a plurality of (for example five) parallel bead wires 28 are embedded along the length thereof so that the windings of the rubber tape 29 overlap one upon another in the radial direction.

Figure 5C:
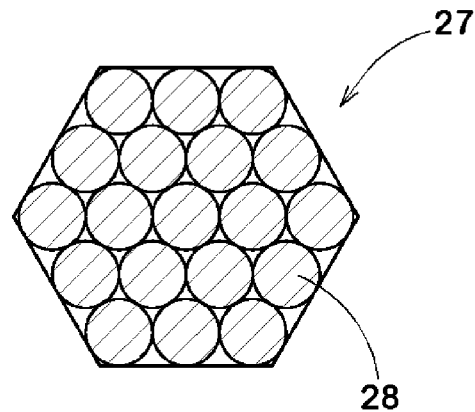
FIG. 5(C) is a cross sectional view of a multi-winding bead core.

FIG. 5(C) shows so called multi-winding bead core 27 formed by winding a rubber-coated bead wire 28 into multiple layers each layer including multiple windings of the bead wire 28.

The reason for the preference of such cable bead core 13 is due to the following tire manufacturing method.

According to the method, the bead apex 8 is attached to the bead core 5 (5A, 5B) in order to form a bead-core-and-apex assembly 20.

Figure 6:
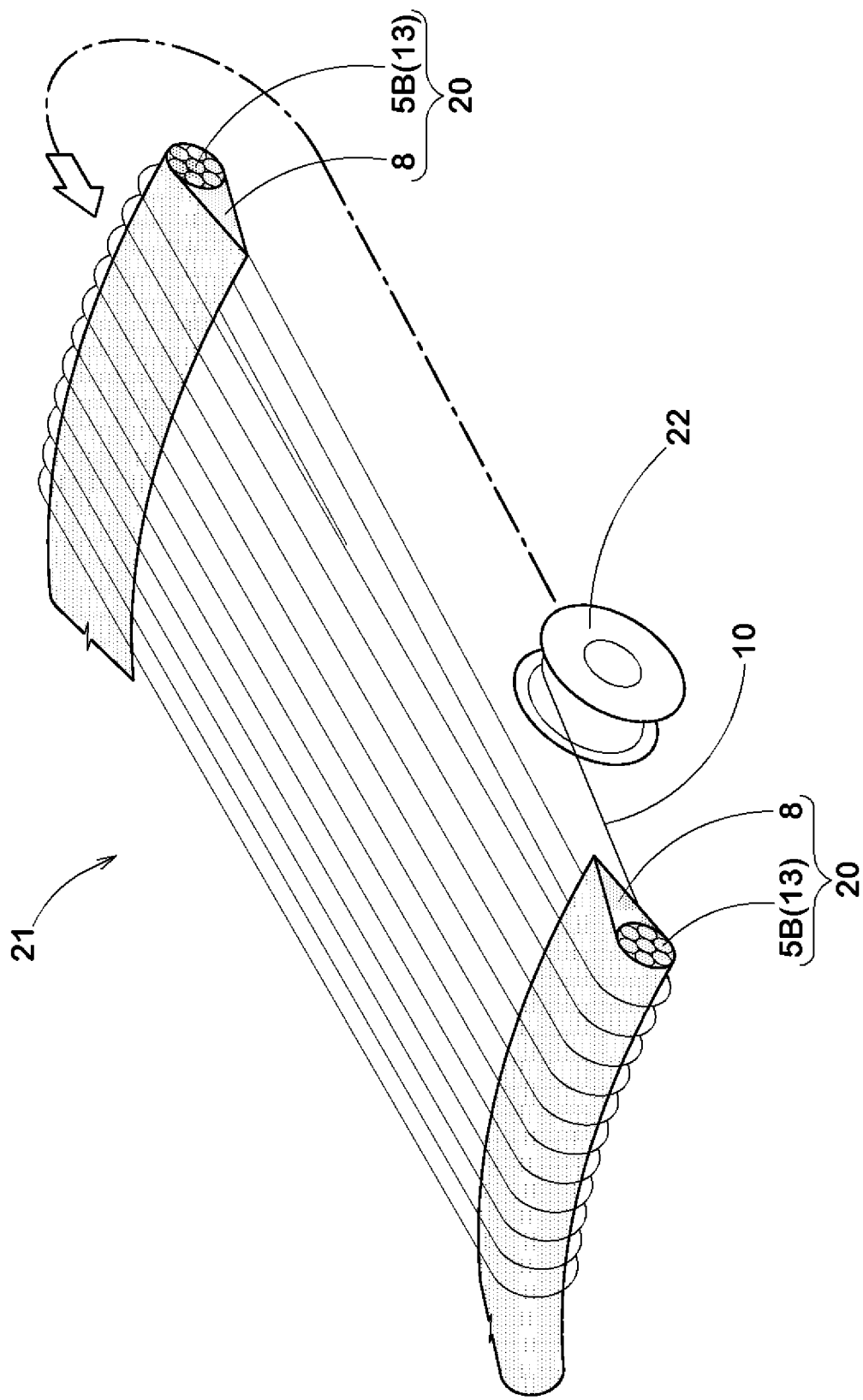
FIG. 6 is a perspective view for explaining a method for making a carcass ply.
Figure 7A:
FIGS. 7(A) to 7(E) are diagrams for explaining a method for manufacturing the pneumatic tire.

As shown in FIG. 6 and FIG. 7(A), the two bead-core-and-apex assemblies 20 are held such that the distance between the bead cores 5A and 5B becomes substantially equal to the length of the carcass cord between the bead cores 5A and 5B in the finished pneumatic tire 1, and the bead apexes 8 are oriented sideways to confront each other.

Figure 7B:
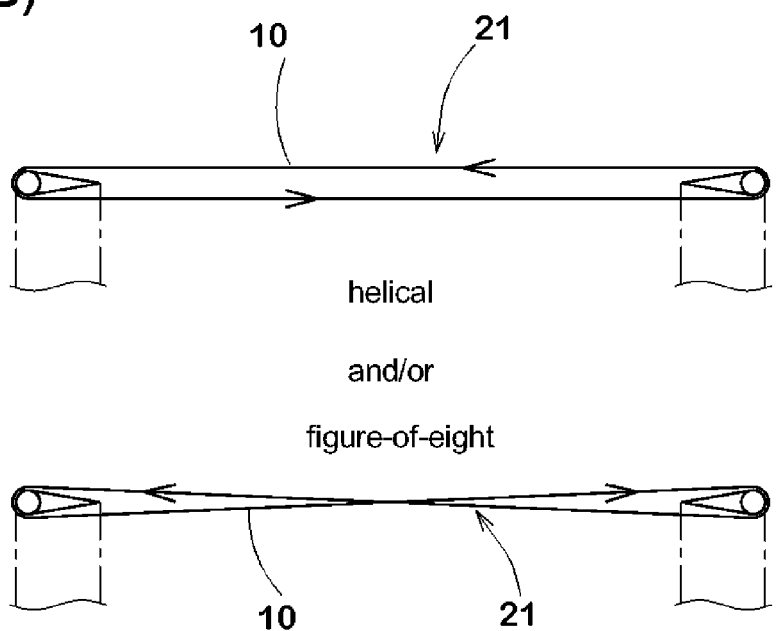

In this state, as shown in FIG. 7(B), the carcass cord 10 is looped around the bead cores 5A and 5B to form a cylindrical assembly 21 of the carcass ply and the bead assemblies 20. In this process, a spool 22 of the carcass cord 10 is moved according to the path of the carcass cord 10 as shown in FIG. 6.

Figure 7C:
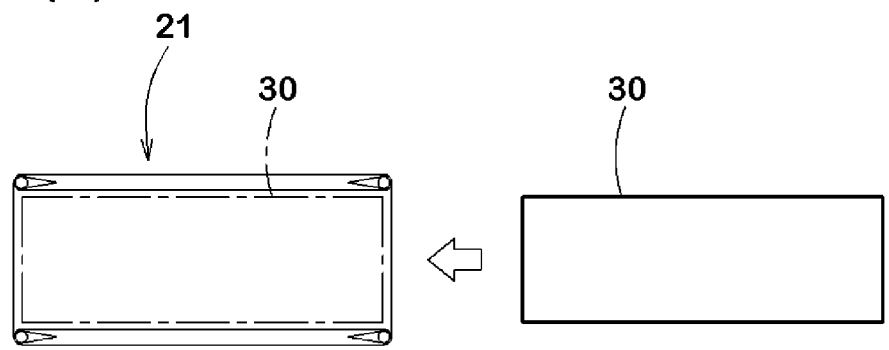

In the next process, an inner liner rubber 30 is applied to the inner circumferential surface of the cylindrical assembly 21. To achieve this, as shown in FIG. 7(C), a thin seat of inner liner rubber 30 is wound around an expandable cylindrical drum (not shown) to form a cylindrical inner liner rubber 30 whose outer diameter is smaller than the inner diameter of the cylindrical assembly 21. Then, the cylindrical inner liner rubber 30 on the drum is inserted in the cylindrical assembly 21, and the drum is expanded to adhere the inner liner rubber 30 to the inside of the cylindrical assembly 21.

Figure 7D:
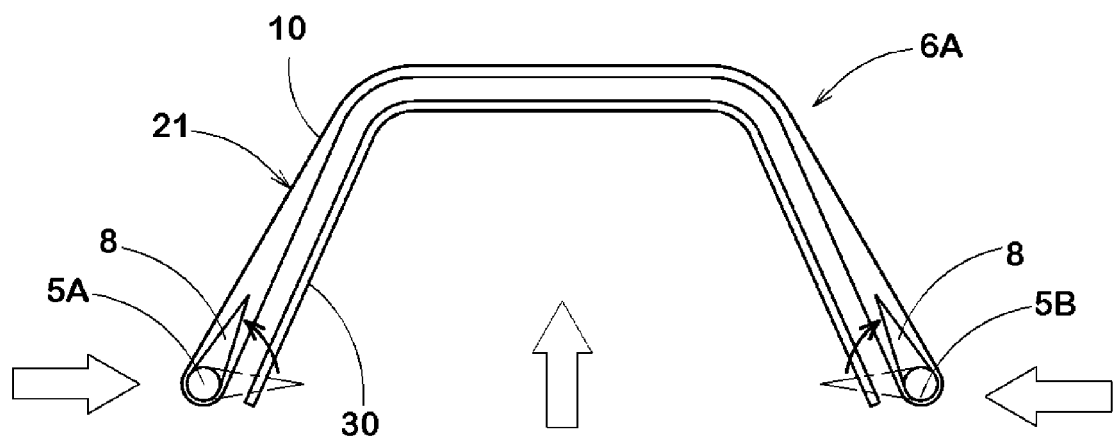

Next, onto the cylindrical assembly 21, a sidewall rubber (not shown) defining the surface of the sidewall portion 3, a bead rubber (not shown) defining the surface of the bead portion 4 and the like are applied, and the assembly is shaped into a toroidal shape as shown in FIG. 7(D). Therefore, as the assembly is swelled, it is necessary to decrease the distance between the bead cores 5A and 5B, and at the same time, it is necessary that the bead core 5 rotate together with the bead apex 8 so that the bead apex 8 orients radially outwards.

This is the reason for the cable bead core 13 being preferred.

Figure 7E:
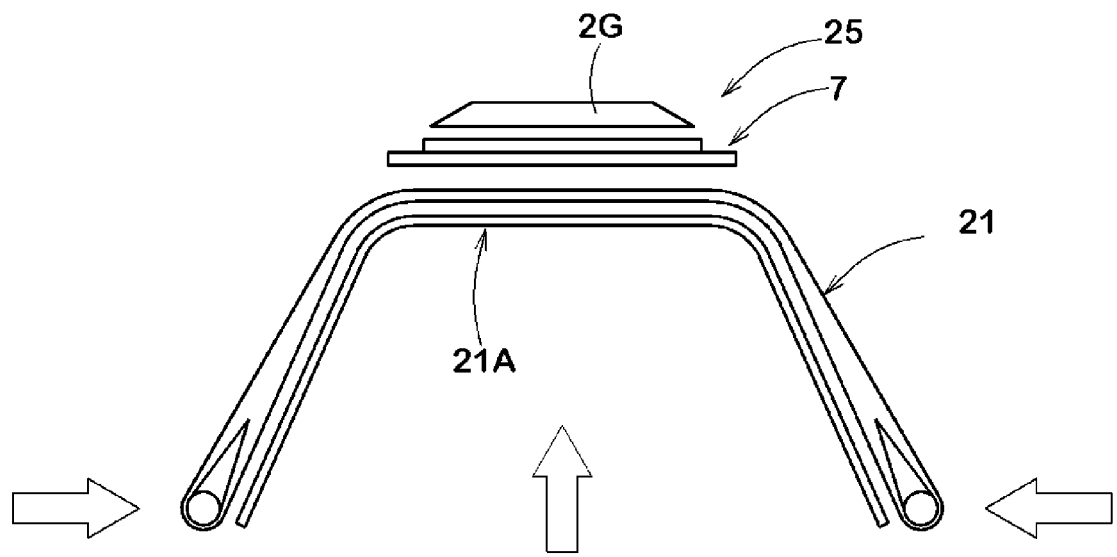

After shaped into a toroidal shape, in order to form a raw tire, as shown in FIG. 7(E), tread components, e.g. the belt 7, tread rubber 2G and the like are applied to the swelled crown portion 21A of the assembly 21.

Otherwise, an annular tread ring 25 which is an assembly of tread components, e.g. the belt 7, tread rubber 2G and the like is formed beforehand, and the tread ring 25 is placed around the crown portion 21A of the assembly 21 being swelled so that the inside of the tread ring 25 closely contacts with the swelled crown portion 21A to form a raw tire.

In the case that the height Ha of the bead apex 8 is less than 15 mm or the bead apex 8 is not used, the bead core 5 which is not rotatable or hard to rotate, for example, the tape bead core 26 shown in FIG. 5(B), the multi-winding bead core 27 shown in FIG. 5(C) and the like may be used.

Figure 8:
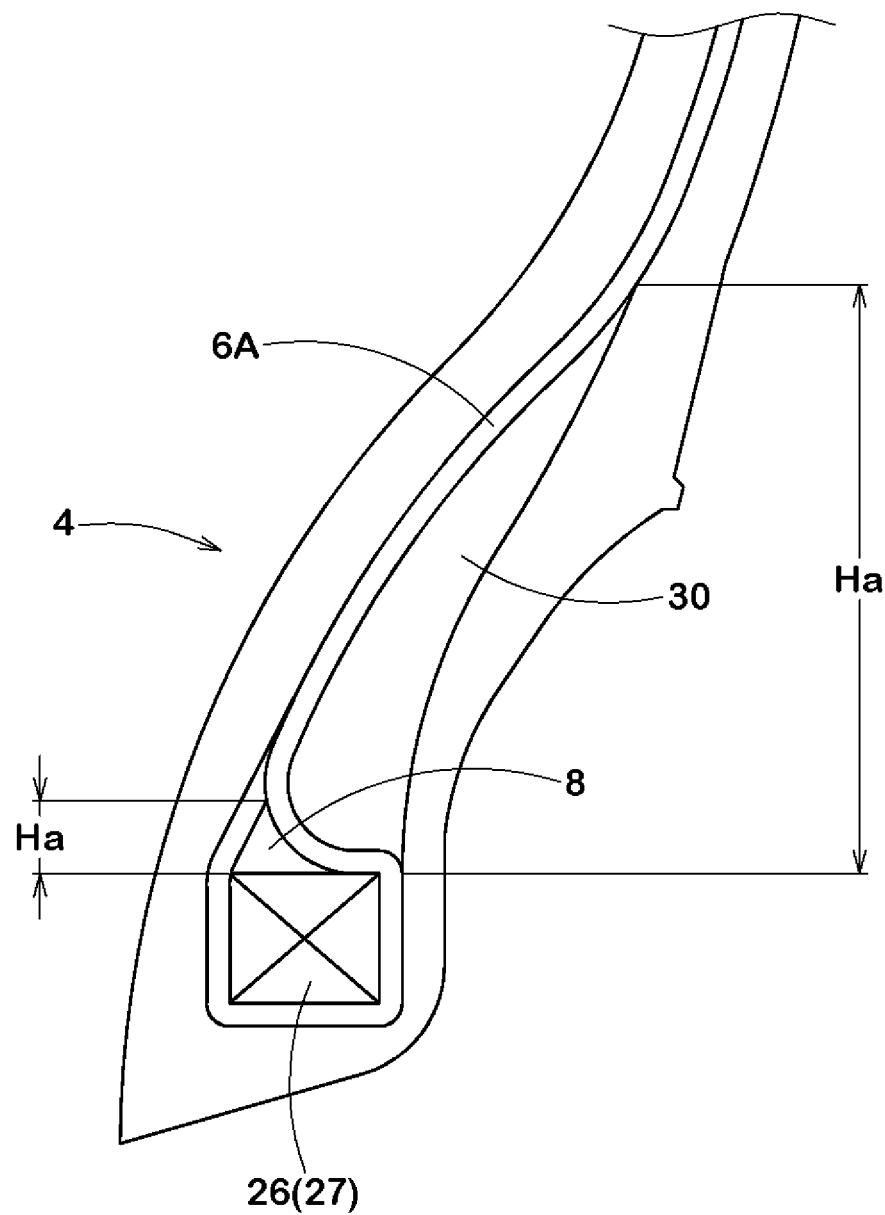
FIG. 8 is a cross sectional view showing another example of the bead structure.

In the case that the height Ha of the bead apex 8 is less than 15 mm or the bead apex 8 is not used, in order to reinforce the bead portions 4 and increase the bead rigidity, and thereby to improve the bead durability and steering stability, a bead reinforcing filler 30 made of the above-mentioned hard rubber is disposed axially outside the carcass ply 6A as shown in FIG. 8.

Such bead reinforcing filler 30 can be applied after shaped into a toroidal shape, therefore, it is not necessary to rotate the bead cores.

Incidentally, in FIG. 8, the height Ha of the bead apex 8 is less than 10 mm which is insufficient for reinforcing the bead portion, therefore, the bead reinforcing filler 30 is used.

In order to prevent direct contacts between the windings of the carcass cord 10, preferably the carcass cord 10 is coated with a topping rubber 23 before wound.

Figure 9A:
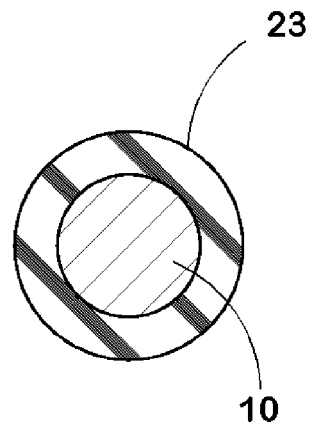
FIG. 9(A) to 9(E) are cross sectional views each showing an example of the rubber-coated carcass cord(s).
Figure 9D:
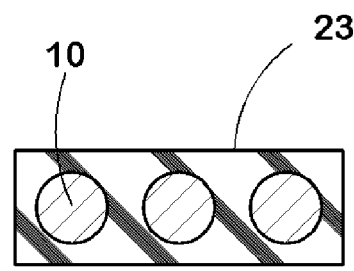
Figure 9B:
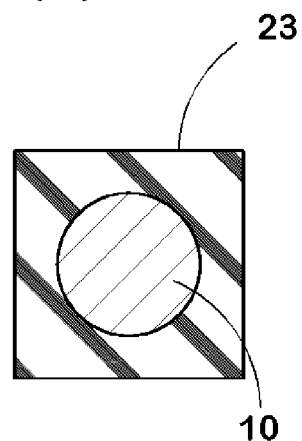
Figure 9E:
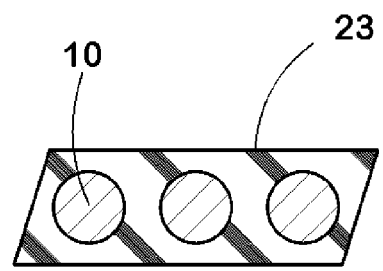
Figure 9C:
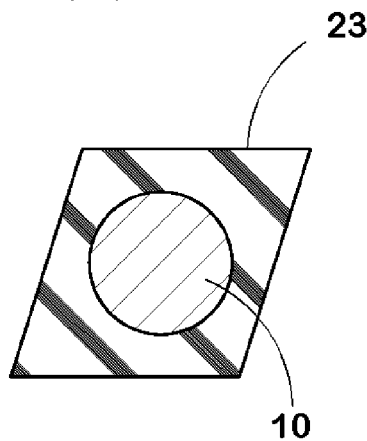

FIGS. 9(A), 9(B) and 9(C) show examples in which the carcass cord 10 is covered with the topping rubber 23 so as to have a round cross sectional shape, a rectangular cross sectional shape, a diamond cross sectional shape, respectively.

FIGS. 9(D) and 9(E) show examples in which a plurality of (two-ten) carcass cords 10 are laid parallel each other and covered with the topping rubber 23 in a form of a tape having a rectangular cross sectional shape, and a parallelogram cross sectional shape, respectively.

Comparison Tests

Pneumatic tires (size 195/65R15) having the structure shown in FIG. 1 were made and tested for the durability and steering stability, and the tire weight was measured.

Except for the specifications shown in Table 1, the test tires had substantially same specifications.

The common specifications are as follows.
Carcass (single ply)
 carcass cord material: PET
 carcass cord structure: 1670 dtex/2
 cord angle: substantially 90 degrees WRT tire equator
 cord count: 50/5 cm
Belt layer (two cross plies)
 belt cord material: steel
 belt cord structure: 1×3×0.27HT
 cord angle: 20 degrees WRT tire equator
 cord count: 40/5 cm
Band (single ply: full-width ply)
 band cord material: nylon 66
 band cord structure: 1400 dtex/2
 cord angle: substantially 0 degrees WRT tire equator
 cord count: 49/5 cm
Bead Apex
 hardness: 65 degrees
Bead Reinforcing Filler
 hardness: 65 degrees
Cable Bead Core
 core wire: steel wire of 1.80 mm dia.
 sheath layer (single layer)
 sheath wires: steel wire of 1.40 mm dia.
 number of sheath wires: 7
Tape Bead Core
 structure: 4S×4T
 bead wire: steel wire of 1.20 mm dia.

(1) Durability Test
using an indoor tire test drum, each test tire was run under accelerated conditions (150% of the maximum tire load specified in JIS; 80% of the tire pressure for the maximum tire load specified in JIS; and running speed of 80 km/h) until the tire was broken, and the running distance was obtained.

The results are indicated in Table 1 by an index based on Ref.1 being 100, wherein the larger the value, the better the durability.

(2) Steering Stability Test
The test tires mounted on wheel rims (size 15×6JJ) and inflated to 200 kPa were attached to the four wheels of a Japanese 2000 cc FF passenger car. The test car was run on an asphalt road in a tire test course by a test driver, and the test driver evaluated the steering stability based on the straight running stability, lane change stability, cornering performance and ride comfort.

The results are indicated in Table 1 by an index based on Ref.1 being 100, wherein the larger the value, the better the steering stability.

TABLE 1

| Tire | Ref. | Ex. 1 | Ex. 2 | Ex. 3 |
|---|---|---|---|---|
| carcass ply | turnup | FIG. 2 helical | FIG. 3 figure eight | FIG. 2 helical |
| turnup height *1 (mm) | 65 | — | — | — |
| Bead core | cable | cable | cable | tape |
| Bead apex height Ha (mm) | 30 | 30 | 30 | — |
| Bead reinforcing filler height Ha (mm) | — | — | — | 30 |
| Tire weight (kg) | 8.0 | 7.6 | 7.6 | 7.6 |
| Durability | 100 | 140 | 140 | 140 |
| steering stability | 100 | 100 | 100 | 100 |

*1) from the bead base line

The invention claimed is:

1. A pneumatic tire comprising a tread portion, a pair of sidewall portions, a pair of bead portions, a pair of bead cores disposed one in each of the bead portions, a carcass ply extending between the bead portions through the tread portion and sidewall portions, wherein the carcass ply is composed of windings of at least one carcass cord looped around the bead cores, and the carcass ply comprises a circumferential part in which said at least one carcass cord is looped around the bead cores in a helical manner, and a circumferential part in which said at least one carcass cord is looped around the bead cores in a figure-of-eight manner.

2. The pneumatic tire according to claim 1, which further comprises
a bead apex disposed in each of the bead portions and within the windings of said at least one carcass cord, the bead apex being made of a hard rubber having a hardness of 50 to 98 degrees and extending radially outwardly from the bead core in a tapered manner, and
a bead reinforcing filler disposed in each of the bead portions and axially outside the windings of said at least one carcass cord, the bead reinforcing filler being made of a hard rubber having a hardness of 50 to 98 degrees and extending radially outwardly in a tapered manner.

3. The pneumatic tire according to claim 2, in which the bead core has a round cross sectional shape and comprises an annular core wire and a sheath layer made of one or more sheath wires helically wound around the core wire.

4. The pneumatic tire according to claim 2, in which the bead core is made of at least one bead wire wound into multiple layers each layer including multiple windings of said at least one bead wire.

* * * * *